(12) United States Patent
Ishifuji et al.

(10) Patent No.: US 6,508,400 B1
(45) Date of Patent: *Jan. 21, 2003

(54) AUTOMATIC IDENTIFICATION EQUIPMENT AND IC CARDS

(75) Inventors: Tomoaki Ishifuji, Tokyo (JP); Masaaki Shida, Hachioji (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/499,024

(22) Filed: Feb. 7, 2000

(30) Foreign Application Priority Data

Feb. 10, 1999 (JP) .............................. 11-032330

(51) Int. Cl.⁷ ................................................ G06K 5/00
(52) U.S. Cl. ..................................... 235/382; 235/380
(58) Field of Search ................................ 235/379, 380, 235/382

(56) References Cited

U.S. PATENT DOCUMENTS

| | | | |
|---|---|---|---|
| 4,816,653 A | | 3/1989 | Anderl et al. |
| 4,827,512 A | | 5/1989 | Hirokawa et al. |
| 5,097,118 A | | 3/1992 | Iijima |
| 5,161,256 A | * | 11/1992 | Iijima ......................... 235/380 |
| 5,517,014 A | * | 5/1996 | Iijima ......................... 235/492 |
| 5,581,464 A | | 12/1996 | Woll et al. |
| 5,698,837 A | * | 12/1997 | Furuta ........................ 235/492 |
| 5,719,387 A | * | 2/1998 | Fujioka ...................... 235/492 |
| 5,821,877 A | | 10/1998 | Fallah |
| 5,845,069 A | * | 12/1998 | Tanaka ....................... 713/200 |
| 6,094,724 A | * | 7/2000 | Benhammou et al. ...... 713/202 |

FOREIGN PATENT DOCUMENTS

| | | |
|---|---|---|
| EP | 553 905 | 8/1993 |
| EP | 617 387 | 9/1994 |
| EP | 709 803 | 5/1996 |
| EP | 867 843 | 9/1998 |
| GB | 2246896 | 2/1992 |
| JP | 7-044425 | 2/1995 |
| WO | 96/10810 | 4/1996 |

OTHER PUBLICATIONS

Jose Zoreda and Jose Oton, "Smart Cards" 1994, pp. 99–121.*
Jose Zoreda and Jose Oton, "Smart Cards" 1994, pp. 123–180.*

* cited by examiner

*Primary Examiner*—Mark Tremblay
(74) *Attorney, Agent, or Firm*—Mattingly, Stanger & Malur, P.C.

(57) ABSTRACT

In a conventional method which defines an authentication key for each record, as the number of the records is increased in an access right management for records in a memory of an IC card, the number of the types of authentication keys is also increased to require a larger memory area for storing the authentication keys, thus causing lower memory efficiency. In order to solve such a problem, terminal types (ex. "0H"–"7H") are defined for interrogators, so that only the number of authentication keys equal to the number of the terminal types are stored. Each record has the number of access permission bits equal to the number of the terminal types, and specifies terminal types, to which an access is permitted, by setting the bits ON or OFF.

3 Claims, 15 Drawing Sheets

AUTOMATIC IDENTIFICATION EQUIPMENT AND IC CARDS

BACKGROUND OF THE INVENTION

The present invention relates to automatic identification equipment for identifying a transponder by transmitting and receiving signals between an interrogator and a plurality of transponders. More specifically, the present invention has a particular feature in a memory configuration for the transponder (IC card).

A conventional method of managing an access right to an IC card is disclosed in JP-A-7-44425. In this method, one authentication key is assigned to an entire card, such that a person who successfully obtains authentication is allowed to access an overall memory of the IC card.

When such a conventional access right management method is extended to an IC card which has a memory divided into a plurality of areas, an authentication key must be set to each area in order to manage the access right for each of the divided areas, and an interrogator desiring an access to such areas must perform authentication for each of areas with different authentication keys. In this case, as the memory is divided into a larger number of areas, the increased number of authentication keys must be stored, so that a larger storage region is required. This results in a reduction in a memory region available to the user.

Assume, for example, that it is desired to individually manage the access rights to a plurality of interrogators for each of plurality of records, into which a memory of an IC card is divided. If the number of authentication keys equal to the number of records is defined, a larger storage region is required for storing the authentication keys, while a memory region available to the user tends to be reduced.

SUMMARY OF THE INVENTION

The terminal types of interrogators are defined, and authentication keys are stored in accordance with the number of the terminal types. Each record has the number of access permission bits equal to the number of the terminal types, such that the bits are set on or off to specify the terminal type which is permitted to an access thereto.

DESCRIPTION OF THE PREFERRED EMBODIMENTS

Figure 1:
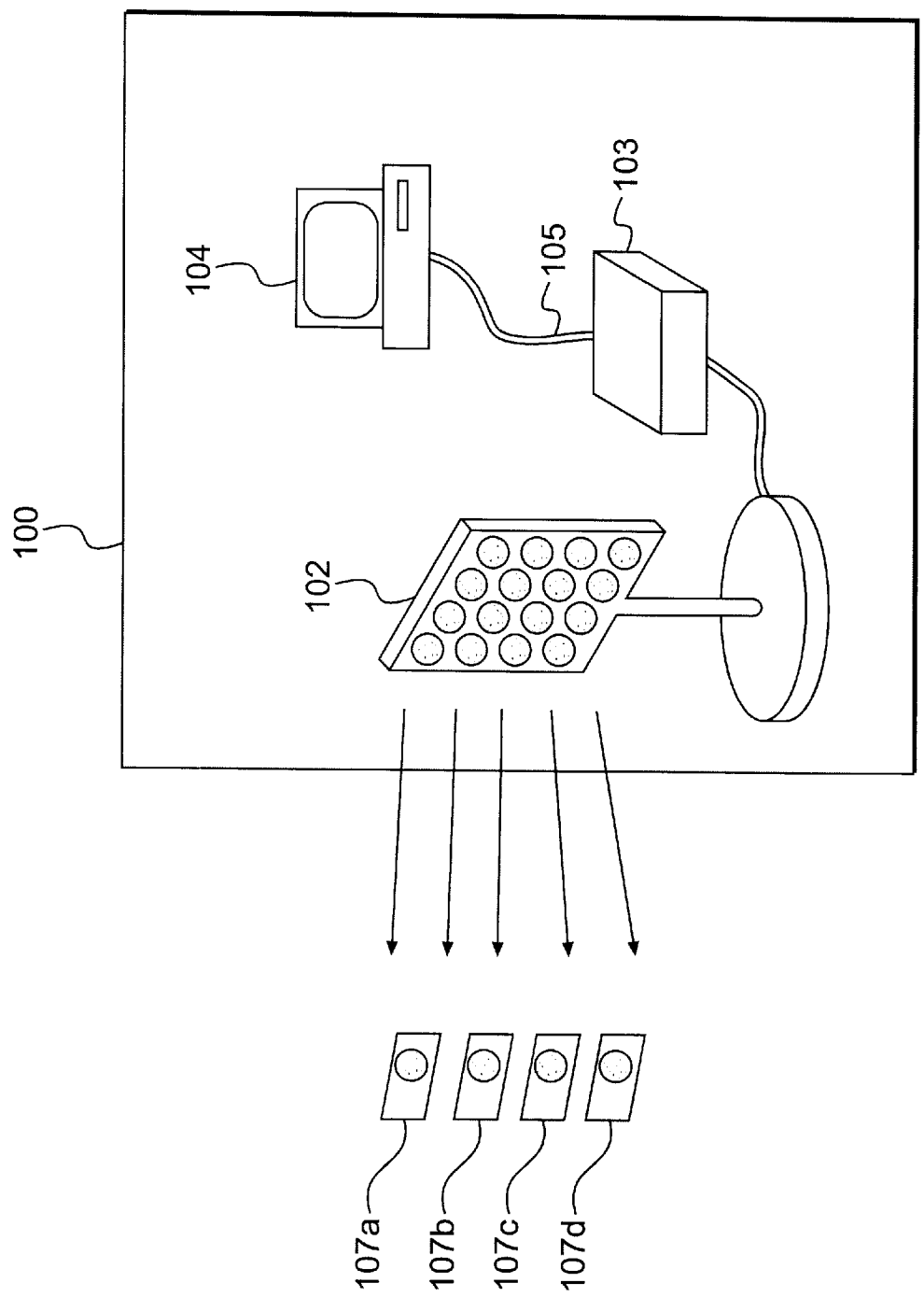
FIG. 1 is a configuration diagram for a system according to the present invention.

Embodiments of the present invention will hereinafter be described with reference to the accompanying drawings. FIG. 1 illustrates the configuration of a system according to the present invention. This system comprises an interrogator 100, which includes an antenna 102, a controller 103, and a control terminal 104 connected to the controller 103 through an RS232C cable 105, and a plurality of IC cards (transponders) 107a–107d. The IC cards 107a–107d are assigned their unique ID numbers, respectively. From the antenna 102, an electromagnetic wave, for example, in a 2.45 GHz band is irradiated to the cards 107, such that each IC card receives a portion of irradiated energy through an antenna mounted thereon and communicates with the interrogator with electric power generated from the received energy. The antenna 102 of the interrogator 100 supplies electric power to the IC cards 107 as well as communicates with the IC cards 107. For example, it can request the IC cards 107 to send their ID numbers back thereto, request the IC cards 107 to write data into memories mounted therein, and request the IC cards 107 to transmit data within the memories back thereto. The IC cards 107 may have built-in batteries, in which case the IC cards 107 communicate with the interrogator 100 with the power from the built-in batteries. With such functions, a variety of application systems such as a logistics management and a management of the access to the room can be built using the automatic identification equipment of the present invention.

Figure 2:
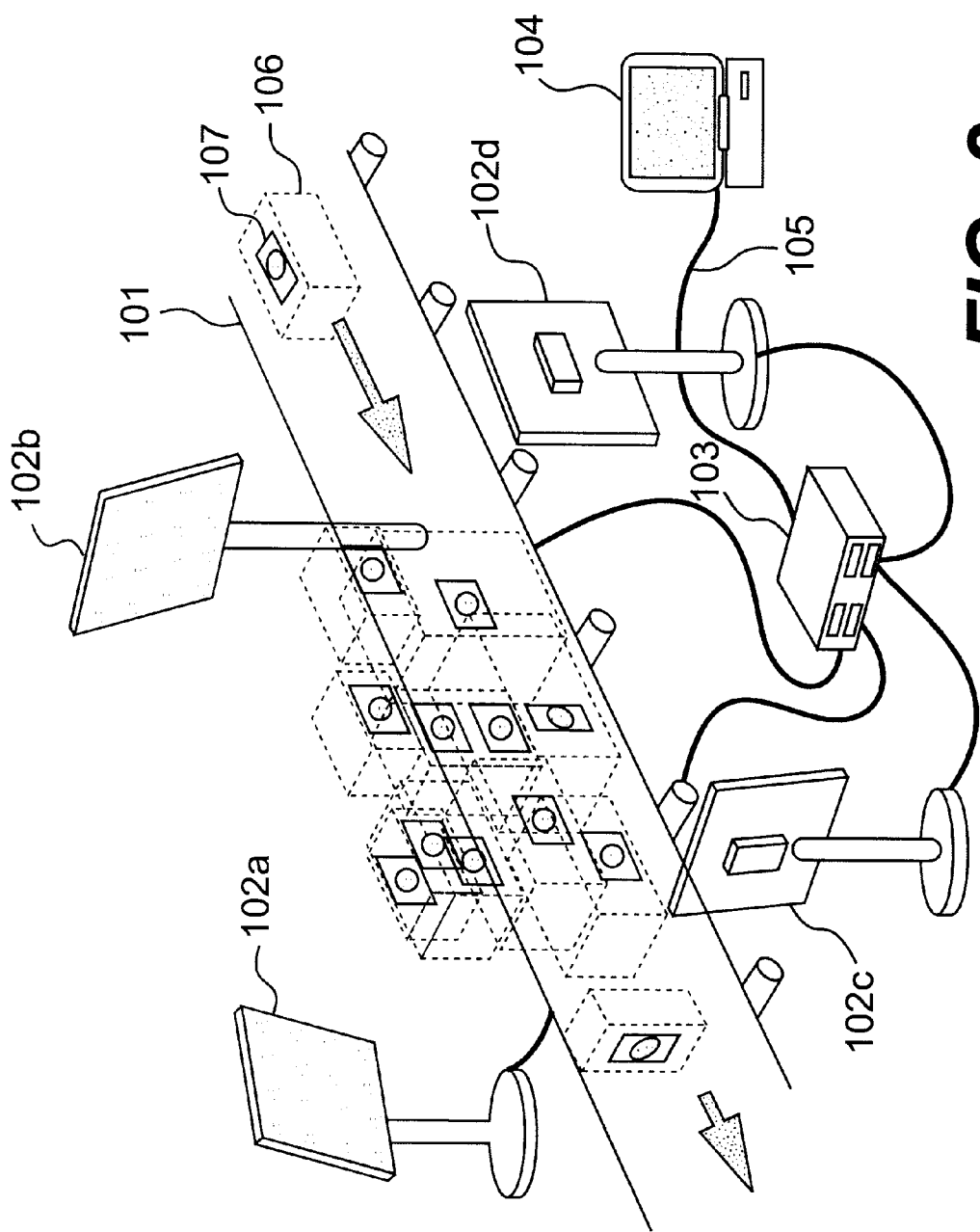
FIG. 2 is an embodiment in which the present invention is applied to a logistics system.

FIG. 2 is an embodiment of a logistics management system. The illustrated logistics management system comprises a belt conveyer 101, antennas 102a–102d, a controller 103, and a control terminal 104 connected to the controller 103 through an RS232C cable 105. While the illustrated embodiment is equipped with four antennas, the number of them is not limited to four. Contactless IC cards 107 are stuck on the surfaces of articles 106, respectively. The IC cards 107 have built-in non-volatile memories each of which stores attributes of the article such as an identification code for the article, a sender, a destination, contents and weight.

The articles 106 are conveyed by the belt conveyer 101 to the irradiation ranges of the antennas 102a–102d. As illustrated, the articles 106 may be conveyed one above the other, and the IC cards 107 stuck thereon may be oriented in arbitrary directions. The controller 103 communicates information with the IC cards 107 through the antennas 102 in accordance with instructions from the control terminal 104. As main instructions from the control terminal 104, there are three instructions: a read instruction, a write instruction and an identify instruction.

Upon receipt of the read instruction, the controller 103 reads the attributes of the articles written in the non-volatile memories of the IC cards 107, and transmits the attribute information to the control terminal 104 through the connection cable 105. The control terminal 104 totally manages the identified article attribute information for utilization in subsequent works (verification and assortment of articles and so on). Upon receipt of the write instruction, the controller 103 writes new information such as routing information for transport of the articles and the time the article arrives, into the non-volatile memories of the IC cards 107. Upon receipt of the identify instruction, the controller 103 controls the collision of responses from the IC cards 107 located within the coverage area, to identify them.

Figure 3:
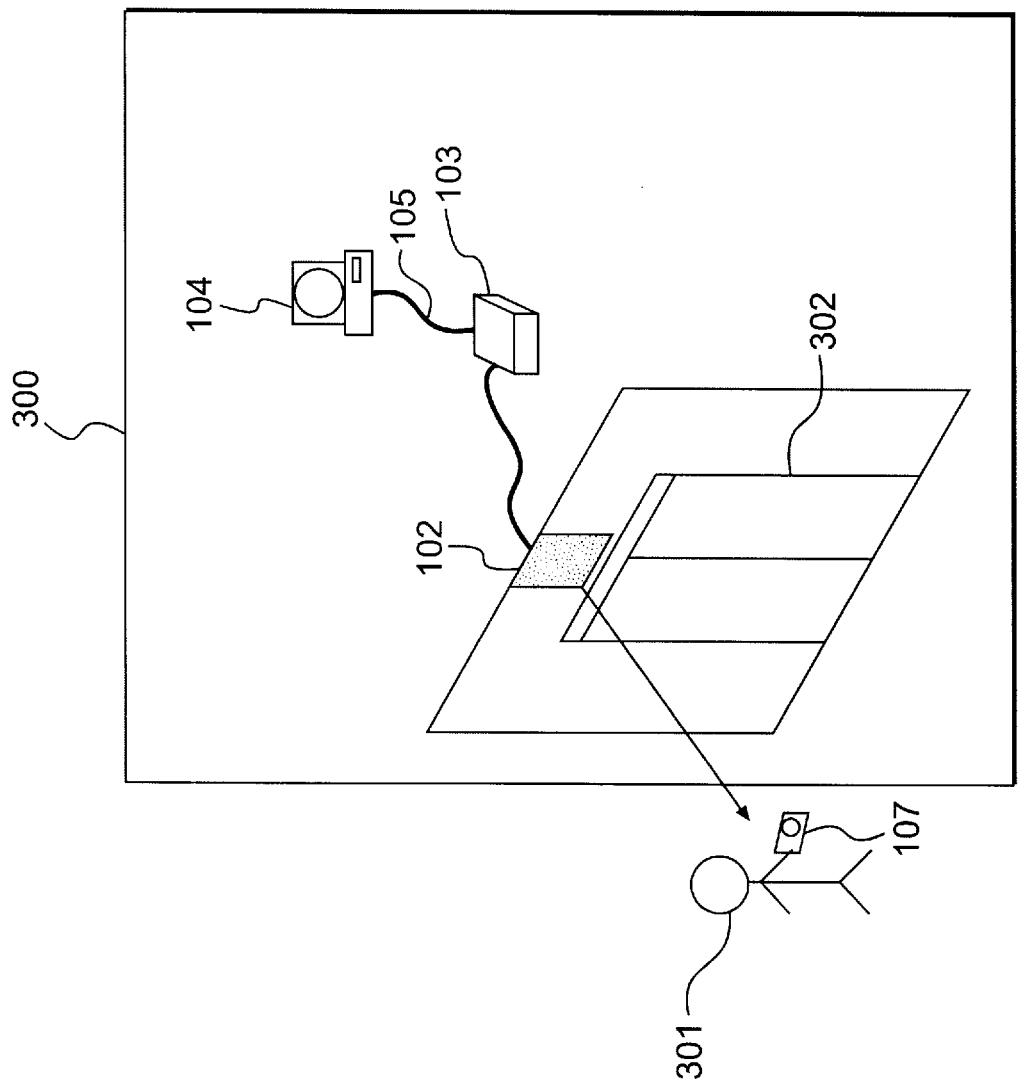
FIG. 3 is an embodiment in which the present invention is applied to system for a management of the access to the room.

FIG. 3 is an embodiment of a system for management of the access to the room. This system for management of the access to the room comprises an automatic door 302, an antenna 102, a controller 103, and a control terminal 104 connected to the controller 103 through an RS232C cable 105. A person 301 attempting to pass through the automatic door 302 should possess an IC card 107. The IC card 107 has a built-in non-volatile memory which stores the attributes of the owner 301 such as his identification code, his name and his position.

The owner 301 holds the IC card 107 to the antenna 102, which is installed above the automatic door, such that the IC card 107 is irradiated with the electromagnetic wave from the antenna 102. Although only one antenna 102 is installed in this embodiment, a plurality of antennas may be provided so that the IC card may be held in any arbitrary direction. The controller 103 communicates information with the IC card 107 through the antenna 102 in accordance with instructions from the control terminal 104. As main instructions from the control terminal 104, there are three instructions: a read instruction, a write instruction and an identify instruction.

Upon receipt of the read instruction, the controller 103 reads the attributes of the owner written in the non-volatile memory of the IC card 107, and transmits the attribute information to the control terminal 104. The control terminal 104 totally manages the identified attribute information to manage the accesses to the room (controlling the automatic door, recording the accesses to the room, and so on). Upon receipt of the write instruction, the controller 103 writes new information such as room access recording (a room number, room access time, and so on) into the non-volatile memory of the IC card 107. Upon receipt of the identify instruction, the controller 103 controls the collision of responses from the IC cards 107 located within the coverage area, to identify them.

Figure 4:
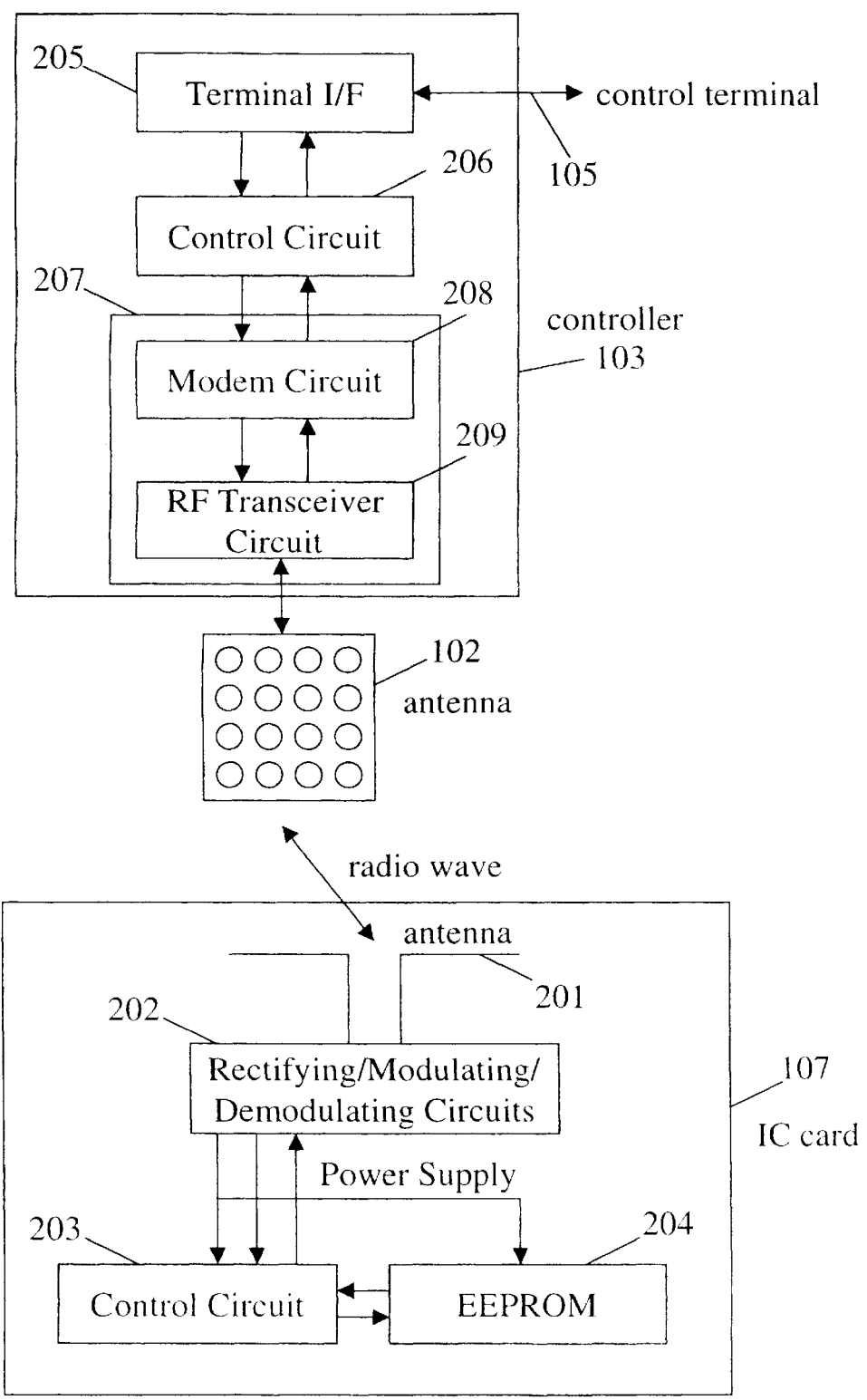
FIG. 4 a diagram illustrating the configuration of automatic identification equipment and an IC card according to the present invention.

Referring now to FIG. 4, the controller 103 and the contactless IC card 107 will be described in terms of the configuration. The IC card 107 comprises an antenna 201, rectifying/modulating/demodulating circuits 202, a control circuit 203, and an EEPROM 204. A non-volatile memory such as an FRAM (ferroelectric memory) may be used other than the EEPROM. The rectifying circuit 202 generates supply power from the radio wave irradiated to the antenna 201 and generates a clock. The supply power and clock generated by the rectifying circuit 202 are distributed to the control circuit 203 and the memory 204 for use in communications with the controller 103 and the read/write processing for the memory 204. Also, a transmission signal sent from the controller 103 is received by the antenna 201 of the IC card 107, and demodulated by the demodulating circuit 202. The control circuit 203 executes the read/write processing for the memory 204 in accordance with the instructions in the received transmission signal. Transmission data from the IC card 107 is read from the memory 204, modulated by the modulating circuit 202, and irradiated from the antenna 201.

The controller 103 comprises a high-level controller interface 205 for controlling the interface with the control terminal through a connection cable 105, a control circuit 206, and an RF unit 207. The RF unit 207 includes a modem circuit 208 and an RF transceiver circuit 209. The modem circuit 208 performs the conversion between a digital signal and an analog signal. The RF transceiver circuit 209 converts a baseband analog signal, which is outputted from the modem circuit, to a transmission signal in a carrier frequency band, and amplifies the converted transmission signal. The circuit 209 also converts a reception signal in the carrier frequency band, which is received by the antenna, to a baseband analog signal, and amplifies the converted baseband analog signal.

Figure 5:
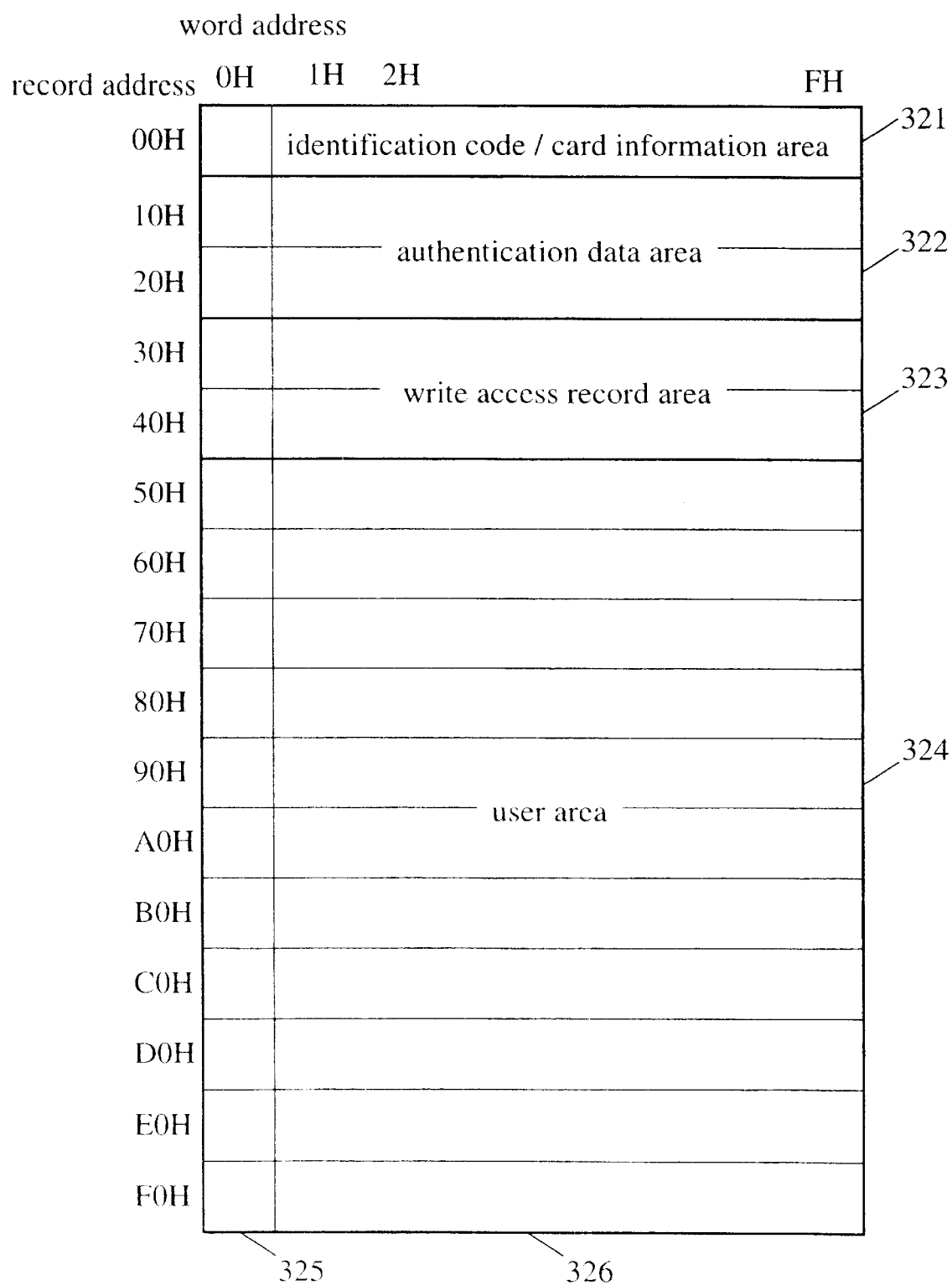
FIG. 5 is an example of a memory configuration ration in an IC card according to the present invention.

FIG. 5 is an example of the memory configuration of the IC card. In this example, the memory has the capacity of 512 bytes. The memory is partitioned into records in units of 16 words (32 bytes). The first word in each of the records is an access right word 325 for managing the read/write rights to the record, and the remaining 15 words are a data area 326. The record at the lowest address is an ID/card information area 321, the next two records are an authentication data area 322, another next two records are a write access record area 323, and the remaining 11 records are a user data area 324.

The ID/card information area 321 is an area which stores information required when the IC card is powered to start the operation, and the ID of the card.

The authentication data area 322 is used for matching with authentication data sent thereto from an interrogator when the IC card authenticates the interrogator. As will be later described, eight types of interrogators (terminals) are defined, and authentication data defined for each of the types of terminals is stored in the authentication data area 322. The authentication data sent thereto from the interrogator is matched with the authentication data stored in the memory in the IC card, in such a manner that a read instruction and a write instruction can be accepted only when both authentication data are matched.

The write access record area 323 is an area for recording the terminal ID of the interrogator which issues the write instruction, and the writing address when the IC card accepts the write instruction to write data in a certain area of the memory. For example, the write access record area is configured as a ring buffer capable of recording, for example, the past 14 write access records. When the writing is performed more than 14 times, the oldest write access record data is overwritten.

The authentication can prevent data within the memory from being tampered by a forged terminal, while the write access record management can preserve write access records for tampered data within the memory through unauthorized accesses.

The authentication data area 322 and the write access record area 323 can be allotted with respective sizes in a variety of ratios depending on the number of types of terminals, the number of write access records which must be held, and the memory capacity, not limited to the aforementioned allotment. In addition, the authentication function and the write access record management function can be turned ON/OFF depending on a required security level. When the functions are turned OFF, the corresponding areas can be used as a user data area.

Figure 15:
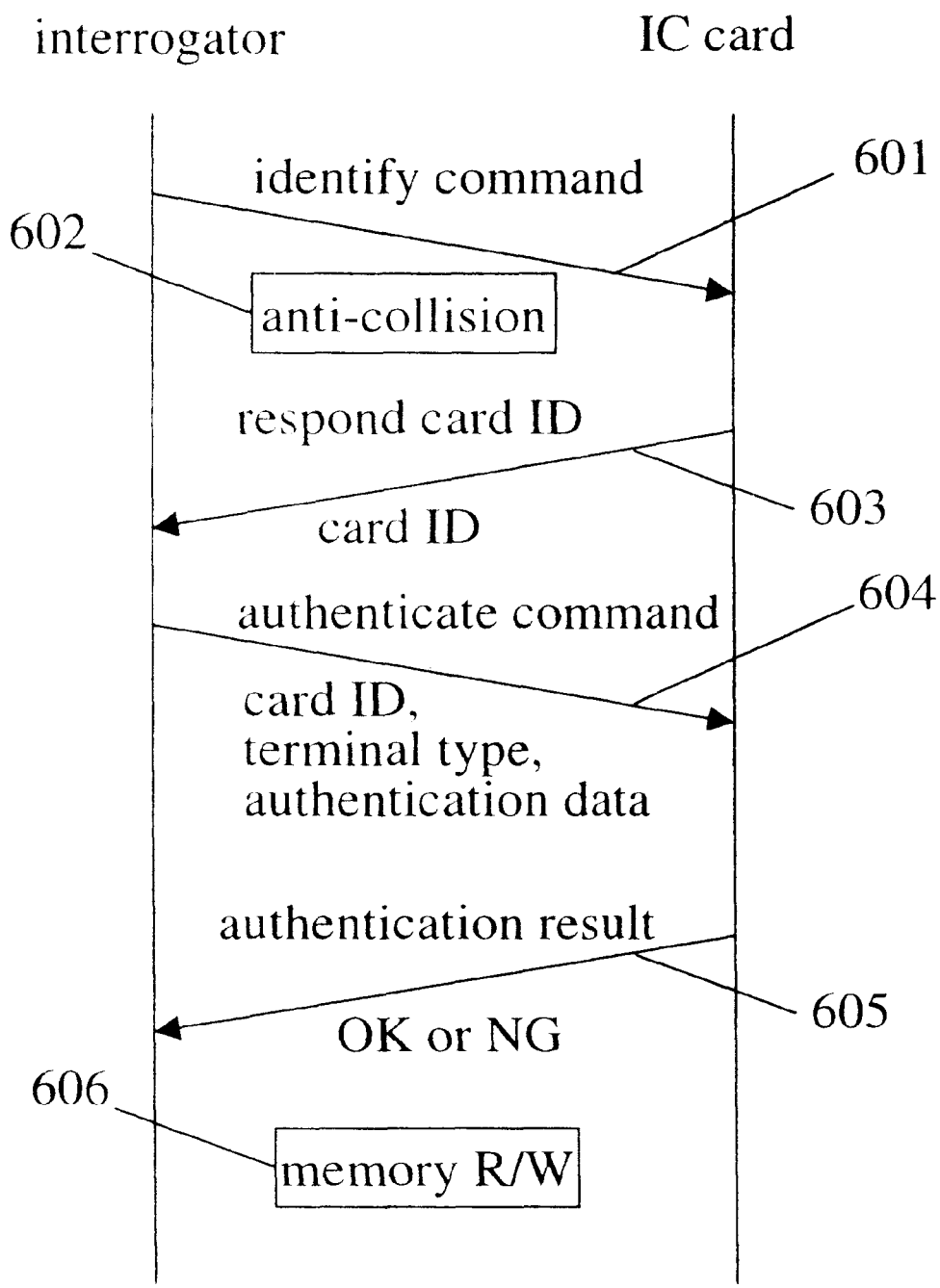
FIG. 15 is a diagram illustrating an embodiment of an authentication procedure in an automatic identification equipment according to the present invention.

A procedure for terminal authentication will be described with reference to FIG. 15. In FIG. 15, explanations written above arrows indicate the types of the associated communications, and explanations written below represent the types of data which are sent through the communications. An interrogator first issues an identify instruction 601 to IC cards. As the IC cards recognize the identify instruction, an appropriate anti-collision procedure 602 is executed between the interrogator and the IC cards. Only one of the existing IC cards transmits its card ID back to the interrogator (603), causing the interrogator to recognize the one IC card. The interrogator transmits an authentication request 604 to the recognized IC card. The IC card matches the sent authentication data with authentication data within its memory to transmit the result (OK or NG) back to the interrogator (605). Only when the authentication result shows OK, the interrogator can proceed to a subsequent procedure 606 for memory read or memory write.

Figure 6:
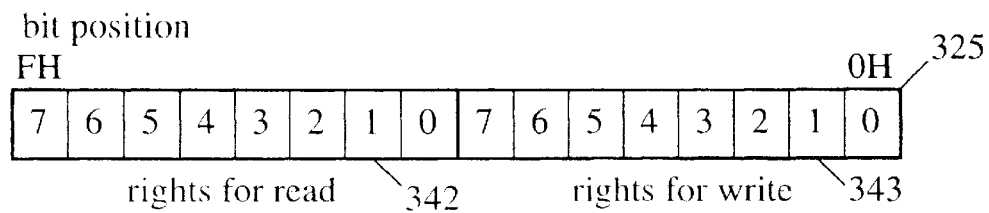
FIG. 6 is a diagram showing the structure of an access right word.

Next, the structure of the access right word 325 will be described with reference to FIG. 6. The access right word 325 is composed of a WRITE right byte 343 from bit "0H" to bit "7H", and a READ right byte 432 from bit "8H" to bit "FH". In the WRITE right byte 343, the bits "0H" to "7H" represent the presence or absence of the WRITE access rights to the record for eight types of terminals "0H" to "7H", respectively. For example, when the WRITE right byte has the value of "34H", the interrogators of the terminal types "2", "4" and "5" can only write into the record. Similarly, in the READ right byte 342, the bits "8H" to "FH" represent the presence or absence of the READ access rights to the record for the eight types of terminals "0H" to "7H", respectively. For example, when the READ right byte has the value of "CBH", the interrogators of the terminal types "0", "1", "3", "6" and "7" can only read the record. The access right word must be previously initialized in any appropriate way.

It is also possible to define some of the eight terminal types as special terminals. For example, the interrogator of the terminal type "0" may be defined as a privileged terminal which is allowed to read and/or write all records irrespective of the value of the access right word. In this event, it is desired that the interrogator of the terminal type "0" can be used to initialize the access right word.

Figure 7:
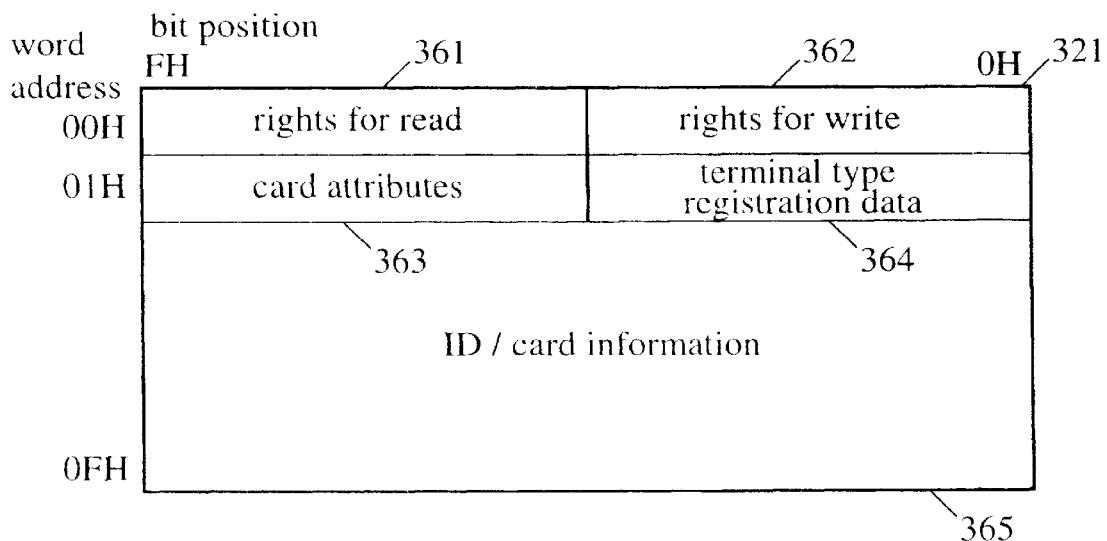
FIG. 7 is a diagram showing a memory configuration in an ID/card information area.

FIG. 7 shows an example of the memory configuration for the ID/card information area 321. The access right for this record is managed by READ right byte 361 and WRITE right byte 362. A card attribute parameter 363 has the size of eight bits, and is composed of a sequence of bits which represent the attributes for specifying the operation mode of the IC card such as ON/OFF of the authentication function and ON/OFF of the write access record function. Terminal type registration data 364 has the size of eight bits, each of which represents whether or not authentication data is registered for one of the eight terminal types. For example, the associated bit of "1" represents "registered", while the associated bit of "0" represents "not registered". An ID/card area 365 is a area for storing an ID number unique to an individual card. Data in this area can be read by the identify instruction without authentication. The ID number is read by the identify instruction, and the anti-collision allows only one of the IC cards to complete the transmission of the ID number back to the interrogator and to set into a communication available state.

Figure 16:
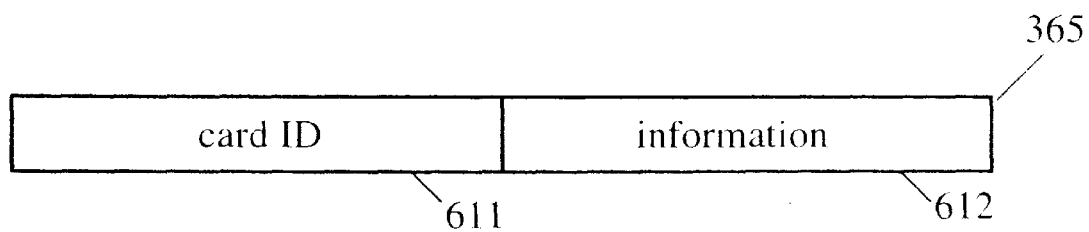
FIG. 16 is a diagram illustrating a memory configuration in an ID/card area.

As shown in FIG. 16, the ID/card area 365 can store not only the ID number 611 unique to the IC card but also card information 612. As long as the card ID 611 is ensured to be an ID unique to an individual card, the overall ID/card area 365, which is a combination of the card ID 611 and the card information 612, is also ensured to be data unique to the individual card. Therefore, it is also possible to perform the anti-collision by regarding the overall ID/card area 365 as an ID. In this case, the card information field 612 is also defined as a data area which can be read by the identify instruction without authentication.

Figure 8:
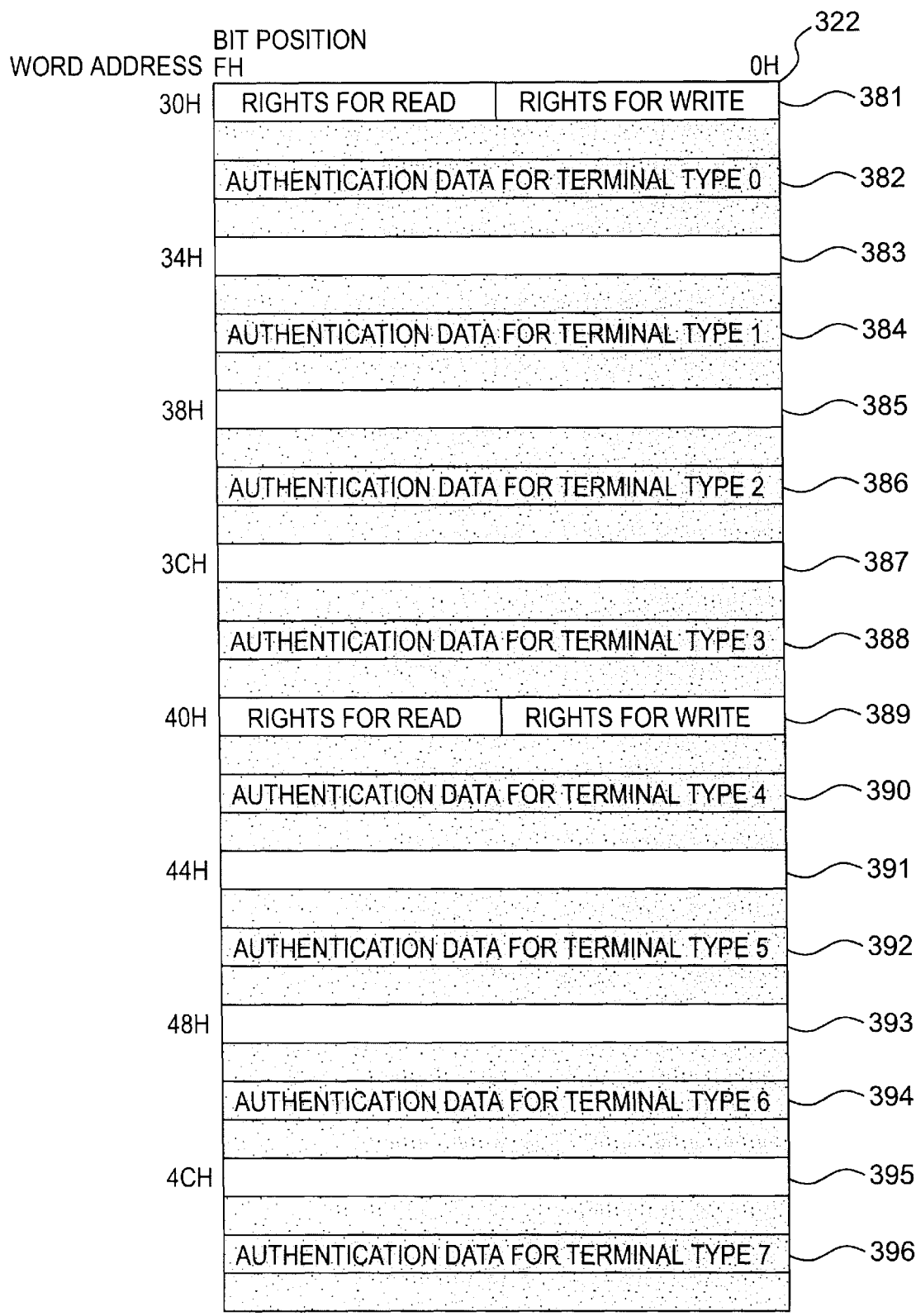
FIG. 8 is a diagram showing a memory configuration in an authentication data area.

FIG. 8 shows an example of the memory configuration for the authentication data area 322. This area is made up of two records, each of which stores authentication data for four terminal types. Specifically, the authentication data for the terminals "0" to "7" are stored in data fields 382, 384, 386, 388, 390, 392, 394 and 396, respectively. Access rights to these records are managed by access right words 381 and 389. Generally, the access right words are set such that the access rights are not opened to the terminal types other than the privileged terminal type "0". In the example shown in FIG. 8, each authentication data has the size of three words (48 bytes). While words 383, 385, 387, 391, 393 and 395 are not used due to a relationship between the size of the records and the size of the respective authentication data, the size of the authentication data can be changed in accordance with a required security level. Thereby, it causes variations in the allotment of storage areas for respective authentication data.

Figure 9:
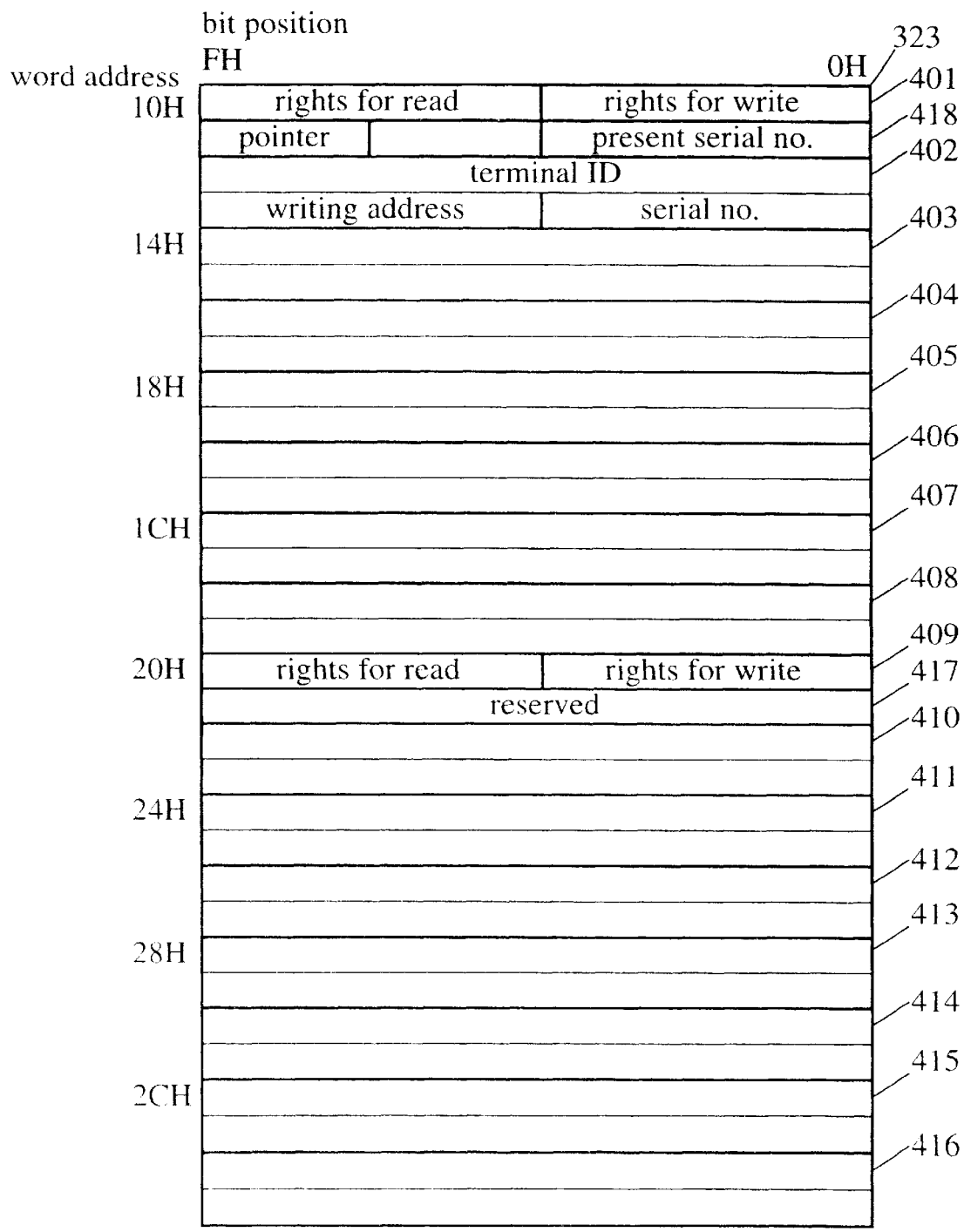
FIG. 9 is a diagram showing a memory configuration in a write access record area.

FIG. 9 illustrates an example of the memory configuration for the write access record area 323. This area is made up of two records, each of which can store seven memory write access record data. Specifically, the first to seventh write access records are stored in data areas 402–408, respectively, and the eighth to fourteenth write access records are stored in areas 410–416, respectively. Access rights to these records are managed by access right words 401 and 409. Generally, the access right words are set such that WRITE access rights are not opened to the terminal types other than the privileged terminal type "0". The number of the write access record data which can be held may be changed in accordance with a required security level. Thereby, it causes variations in the size of the write access record area.

In the example shown in FIG. 9, the write access record area forms a ring buffer such that past 14 memory write access records can be held therein. The held write access record information includes three information: the terminal ID of the interrogator which issues a write instruction, a writing address, and a serial number (see the data area 402). A pointer in a management area 418 holds the address of a next write access record writing area. Also, the current serial number in the management area 418 is 10 copied to a write access record writing area as a serial number when a next write access record is written. In this event, the current serial number is incremented by one.

Figure 10:
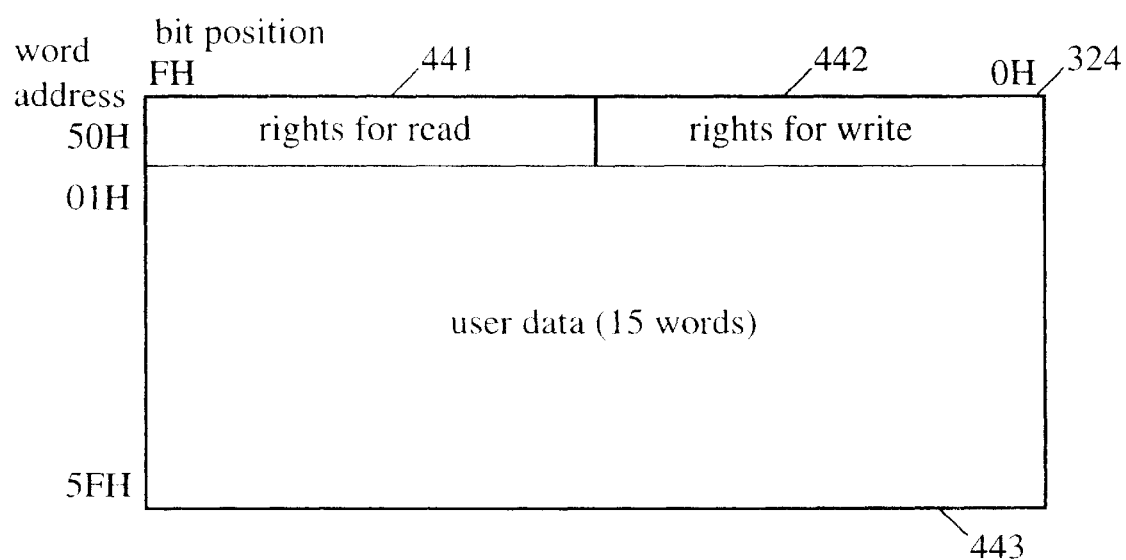
FIG. 10 is a diagram showing a memory configuration of a record in a user data area.

FIG. 10 shows an example of the memory configuration for one record in the user data area 324. The record in this area is composed of access right words 441, 442 and user data 443. The user data 443 has the size of 15 words (30 bytes) per record, and can be freely read and written by the user within the limitations by the access right word.

By using the authentication function for each terminal type in the automatic identification equipment of the present invention, it is possible to provide the flexible operations by a plurality of users having different security levels. In the following, embodiments of such operations will be described with reference to the drawings.

Figure 11:
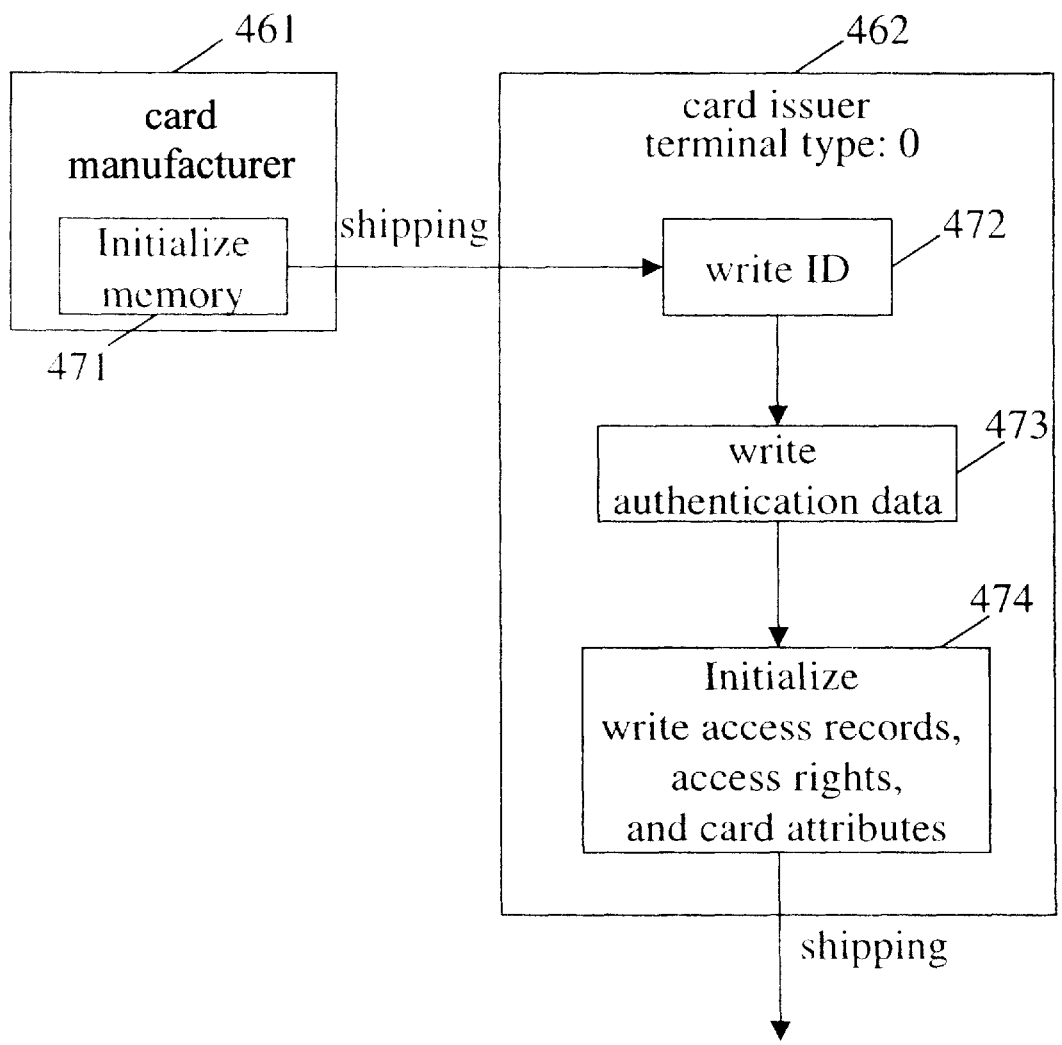
FIG. 11 is a diagram generally illustrating a flow from the production of cards to the issue of the cards.

FIG. 11 generally illustrates a flow from the production of cards to the issue of the cards. The IC cards are produced by a card manufacturer 461 and are shipped to a card issuer 462 after their memories are initialized (471). The card issuer 462 initializes again the memories required for the issue, using an interrogator of the terminal type "0" which is a privileged terminal.

First, each of IC cards is assigned a unique ID, and the ID is written into the card ID field 611 of the ID/card area 365 (472). Next, authentication data corresponding to a required terminal type(s) is written into the authentication data area 322, and the terminal type registration data 364 corresponding to the registered terminal type(s) is initialized. Finally, the write access record information area 323, access right words for individual records, and the card attribute parameter 363 are initialized. After these procedures, the cards are made available to be shipped to users.

Figure 12:
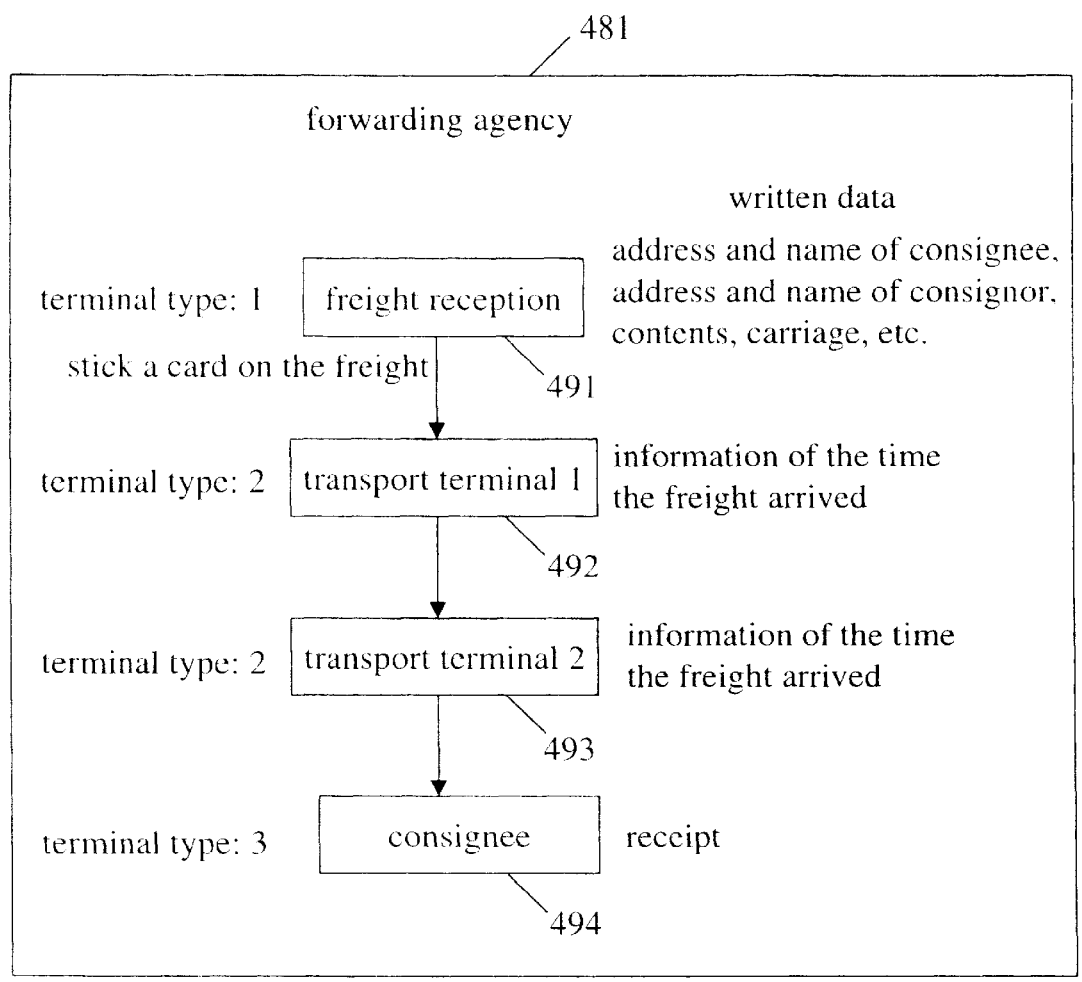
FIG. 12 is a diagram generally illustrating a flow when IC cards are used for a delivered freight management.

FIG. 12 generally illustrates a flow when a forwarding agency 481 utilizes the IC cards shipped by the card issuer 462 for the management of delivered freight. Assume that the forwarding agency 481 employs three types of interrogators classified as the terminal types "1", "2" and "3". The interrogator of the terminal type "1" writes initialization data when freight is accepted and the IC card is stuck on the freight. The data written herein is basic data in the subsequent freight management, so that the data should be written using an interrogator of a terminal type different from those used for the subsequent freight management, such that the contents are not intentionally or accidentally overwritten upon recording the reception at transport terminals and a consignee.

At freight reception 491, an interrogator of the terminal type "1" writes the address and name of the consignee, the address and name of the consignor, the contents, carriage and so on into a certain record within the user data area 324 of the IC card, to stick the IC card on the freight. Afterward, the freight arrives at a transport terminal "1" (492), where an interrogator of the terminal type "2" writes information of the time the freight arrived at the terminal "1" (492) into another record within the user data area 324 of the IC card. Further, as the freight arrives at a transport terminal "2" (493), an interrogator of the terminal type "2" writes information of the time the freight arrived at the terminal "2" (493) into a further record within the user data area 324 of the IC card. In this event, as the terminal type at the freight reception is different from the terminal type at the transport terminals "1" and "2", it is possible to prevent the data written at the freight reception from being intentionally or accidentally overwritten by the writing at the transport terminals. Finally, an interrogator of the terminal type "3" writes receipt recording into a yet further record within the user data area 324 of the IC card at the time the freight is delivered to the consignee 494. In this way, the delivery and the confirmation of the receipt are completed. Again, in this event, as the terminal type used for the confirmation of the receipt is different from the terminal types used at the freight reception and at the transport terminals "1" and "2", it is possible to prevent the data written at the freight reception and the information of the time the freight arrived, written at the transport terminals "1" and "2", from being intentionally or accidentally overwritten due to the writing at the consignee 494.

Figure 13:
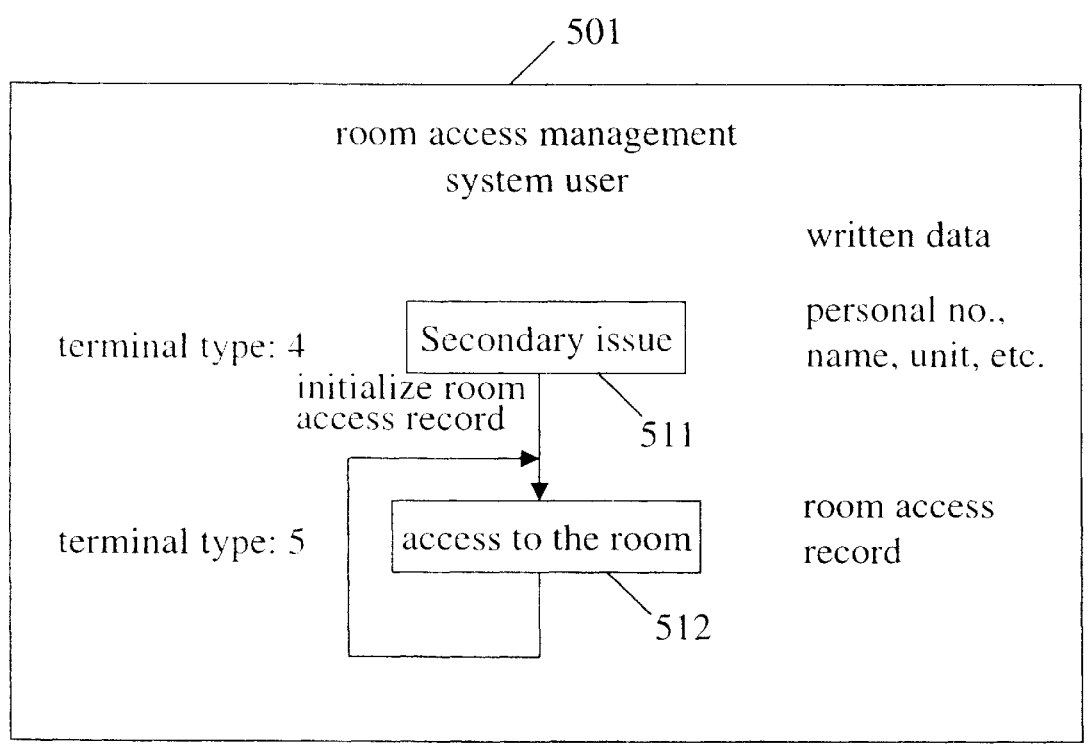
FIG. 13 is a diagram generally illustrating a flow when IC cards are used for the management of the access to the room.

FIG. 13 generally illustrates a flow when a room access management system user 501 utilizes the IC cards shipped by the card issuer 462 for the room access management. Assume, in this embodiment, that the room access system user 501 employs two types of interrogators: the terminal types "4" and "5". The terminal type "44" is used in a secondary issue 511 for issuing an employee identity card to each employee. Data written herein is basic data for an employee who carries the IC card, so that the data should be written by an interrogator of a different terminal type from a terminal type used for the subsequent room access management, such that the contents will not be intentionally or accidentally overwritten upon access to a room.

At the secondary issue 511, an interrogator of the terminal type "4" writes the number, name, position and so on of an employee into a certain record within the user data area 324 of the IC card, and initializes a room access data area in other records within the user data area 324. Then, the card is issued to the employee. Afterward, when the employee enters or exits the room, an interrogator of the terminal type "5" writes room access record information into the room access data area within the user data area 324 of the IC card. In this event, as the terminal type at the access to the room 512 is different from the terminal type at the secondary issue 511, it is possible to prevent the data written at the secondary issue 511 from being intentionally or accidentally overwritten due to the writing at the access to the room 512.

Figure 14:
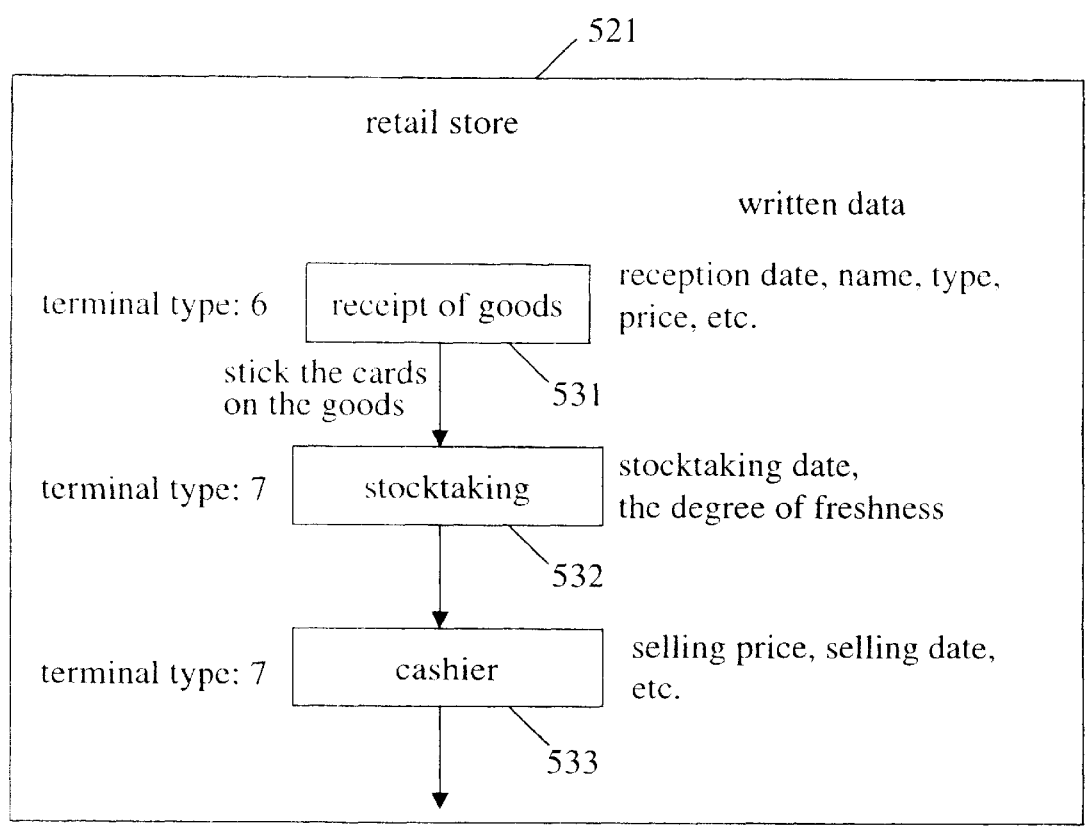
FIG. 14 is a diagram generally illustrating a flow when IC cards are used for a stock management.

FIG. 14 generally illustrates a flow when a retail store 521 utilizes the IC cards shipped by the card issuer 462 for the stock management. In this embodiment, the retail store 521 employs two types of interrogators: the terminal types "6" and "7". The terminal type "6" writes initialization data when goods are received, and IC cards are stuck on the goods. The data written herein is basic data in the subsequent stock management, so that the data should be written using an interrogator of a different terminal type from a terminal type used in the subsequent stock management, such that the contents are prevented from being intentionally or accidentally overwritten during stocktaking or at a cashier.

At receipt of goods 531, an interrogator of the terminal type "6" writes a received date, name, type, price and so on of a good into a certain record within the user data area 324 of each IC card, and the IC cards are stuck on the goods. Afterward, during stocktaking 532, an interrogator of the terminal type "7" writes a stocktaking date, the degree of freshness and so on into another record within the user data area 324 of the IC cards. Also, at the cashier 533, the interrogator of the terminal type "7" writes a selling price, selling data and so on into a further record within the user data area 324 of the IC cards. In this event, as the terminal type at the receipt of goods 531 is different from the terminal type during the stocktaking 532 and at the cashier 533, it is possible to prevent the data written at the receipt of goods 531 from being intentionally or accidentally overwritten due to the writing during the stocktaking 532 or at the cashier 533.

According to the present invention, the flexible access right management can be carried out for each record with respect to each of terminal types without providing the number of authentication keys equal to the number of the records.

What is claimed is:

1. An automatic identification equipment comprising at least two types of interrogators and at least one IC card, wherein a storage device in said each IC card stores authentication keys, the number of which is equal to the number of the types of said interrogators, and has a memory space partitioned into a plurality of areas, each of said plurality of areas including a read permission flag for specifying a type of interrogator which is permitted to read data stored in said area, and a write permission flag for specifying a type of interrogator which is permitted to write data to said area;

each of said read permission flags is composed of one bit, is assigned in correspondence to the type of interrogator, and indicates whether or not the corresponding type of interrogator is permitted to read data from said area;

each of said write permission flags is composed of one bit, is assigned in correspondence to the type of interrogator, and indicates whether or not the corresponding type of interrogator is permitted to write data into said area;

said IC card compares an authentication key transmitted from one interrogator of said interrogators with the authentication key stored in said storage device; and when said transmitted authentication key and said stored authentication key are identical, said IC card determines an access right of said one interrogator for accessing an area in accordance with the value of the read permission flag or the write permission flag associated with the type of said one interrogator provided for said area accessed by said one interrogator.

2. An automatic identification equipment according to claim 1, wherein said each IC card has the type of the interrogator which is permitted to access to all areas within said IC card.

3. An IC card equipped with a writable memory, comprising:

authentication keys, the number of which is equal to the number of terminal types, wherein a memory space of said memory has a plurality of data areas to each of which a plurality of flags are assigned, each of said flags being composed of one bit, being assigned in correspondence to a terminal type, and indicating whether or not the corresponding terminal type is permitted to access the corresponding data area.

* * * * *